US006556391B1

(12) United States Patent
Aoshima et al.

(10) Patent No.: US 6,556,391 B1
(45) Date of Patent: Apr. 29, 2003

(54) BIASING LAYERS FOR A MAGNETORESISTANCE EFFECT MAGNETIC HEAD USING PERPENDICULAR CURRENT FLOW

(75) Inventors: Kenichi Aoshima, Palo Alto, CA (US); Kenji Noma, Atsugi (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/594,115

(22) Filed: Jun. 14, 2000

(30) Foreign Application Priority Data

Dec. 7, 1999 (JP) .......................................... 11-348149

(51) Int. Cl.[7] .................................................. G11B 5/39
(52) U.S. Cl. ................................ 360/324.12; 360/324.2
(58) Field of Search ........................... 360/324.1–324.2

(56) References Cited

U.S. PATENT DOCUMENTS 5,739,987 A * 4/1998 Yuan et al. ................. 360/113
5,898,548 A * 4/1999 Dill et al. ................ 360/324.2
5,901,018 A * 5/1999 Fontana, Jr. et al. ..... 360/324.2
6,157,526 A * 12/2000 Watanabe et al. ...... 360/324.12
6,185,080 B1 * 2/2001 Gill ......................... 360/324.2
6,210,810 B1 * 4/2001 Ikarashi et al. ............. 428/611
6,266,218 B1 * 7/2001 Carey et al. ........... 360/324.12
6,295,186 B1 * 9/2001 Hasegawa et al. ..... 360/324.11
6,327,107 B1 * 12/2001 Komuro et al. ............... 360/55
6,333,842 B1 * 12/2001 Nobuyuki et al. ....... 360/324.2
6,381,107 B1 * 4/2002 Redon et al. ............ 360/324.2
2002/0006020 A1 * 1/2002 Hasegawa ................ 360/324.2

FOREIGN PATENT DOCUMENTS

JP 7176020 7/1995
JP 991629 4/1997

* cited by examiner

*Primary Examiner*—Jefferson Evans
(74) *Attorney, Agent, or Firm*—Greer, Burns & Crain, Ltd.

(57) ABSTRACT

A magnetoresistance effect magnetic head includes a magnetoresistance effect element having a first end and a second end. A biasing portion is provided at the first end and the second end of the magnetoresistance effect element for applying a longitudinal bias magnetic field to the magnetoresistance effect element at the first end or the second end. The biasing portion includes an intermediate layer disposed between an antiferromagnetic first layer and a second layer.

19 Claims, 4 Drawing Sheets

10 15C 15A 9 11 17B 17A 21B 18B 18A 21A 19A 19B 16 12 15B 15 13 14

BIASING LAYERS FOR A MAGNETORESISTANCE EFFECT MAGNETIC HEAD USING PERPENDICULAR CURRENT FLOW

The present invention relates generally to a magnetoresistance effect magnetic head that uses a magnetoresistance effect element. More particularly, the invention relates to biasing layers of a magnetoresistance effect magnetic head disposed at ends of the magnetoresistance effect element for improving reproduction of the signal magnetic field from a magnetic recording medium.

BACKGROUND

Referring now to FIG. 1, a magnetoresistance effect magnetic head 100 (hereinafter called the magnetic head), for example, is well known. FIG. 1 shows a cross-section of the overall structure of the magnetic head 100 as it faces the magnetic recording medium (not shown). A magnetoresistance effect element 101 for sensing the signal magnetic field from the magnetic recording medium, such as a hard disk, is shown in the center portion of the magnetic head 100 in FIG. 1. A well-known magnetoresistance effect (MR) element 101 is a spin valve magnetoresistance effect (SVMR) element. This spin valve magnetoresistance effect element 101 is typically formed from multiple deposited thin-film layers including a first magnetic layer, a nonmagnetic layer, a second magnetic layer, and an antiferromagnetic layer (not shown).

The magnetoresistance effect element 101 also has ends 101A, 101B connected to electrically conductive lead terminals 102A, 102B. Hard films 103A, 103B are placed under the lead terminals 102A, 102B and in contact with the magnetoresistance effect element 101. The magnetoresistance effect element 101, the lead terminals 102A, 102B, and the hard films 103A, 103B are electrically insulated on both the upper and lower sides by an insulating upper gap material 104 and a lower gap material 105. A top 104A of the upper gap material 104 and a bottom 105A of the lower gap material 105 are shielded by soft magnetic shields 106, 107, respectively.

Recently, there has been considerable demand for higher density recording in magnetic recording/reproducing equipment. To detect information (signal magnetic field) magnetically recorded at high densities by using the magnetic head 100, which is very sensitive, the width of the gap W1 between the shields 106, 107 was narrowed and the film thickness of the entire magnetic head 100 was thinned. However, the gap materials 104, 105 must maintain a specific film thickness to maintain its insulating characteristics, and forming thinner gap materials 104, 105 is difficult and costly.

Thus, referring now to FIG. 2, a known magnetic head 200 further narrows a gap width W2 without narrowing the gap material as disclosed in unexamined Patent Publication (Kokai) No. 9-28807. In the magnetic head 200, a magnetoresistance effect element 201 is electrically connected to an upper shield 206 and a lower shield 207, which also function as the lead terminals. This configuration eliminates the need for a gap material 204 between the shield 206 and insulating film 202A, and between shield 206 and insulating film 202B, and eliminates the need for gap material 205 between shield 207 and hard film 209A, and between shield 207 and hard film 209B to further narrow the gap width W2. This, in turn, enables a narrower gap to be fabricated.

The upper and the lower gap materials 204, 205 placed above and below the magnetoresistance effect element 201 are formed from electrically conductive materials. The insulating films 202A, 202B are provided on ends 201A, 201B of the magnetoresistance effect element 201.

Referring again to FIGS. 1–2, the flow direction of the sense current for magnetic head 100 is different from the flow direction of the sense current for magnetic head 200. In the magnetic head 100, the sense current flows from the lead terminal 102A through the magnetoresistance effect element 101 to the lead terminal 102B (or in the reverse direction) in a direction parallel to a generally planar surface 108 of element 101 (only shown in cross section) hereinafter "planar direction". In the magnetic head 200, the sense current flows from the upper shield 206 through the magnetoresistance effect element 201 to the lower shield 207 (or in the reverse direction) in a direction perpendicular to a surface 208 of the element 201, hereinafter "perpendicular direction". The magnetic head 100, in which the sense current flows in the planar direction, is called a CIP (Current In Plane) magnetic head. The magnetic head 200, in which the sense current flows in the perpendicular direction, is called a CPP (Current Perpendicular) magnetic head.

Since the sense current in the CIP magnetic head 100 described above flows in the planar direction, this head cannot use an MR element, for example, that requires the sense current to flow in the perpendicular direction as in a tunnel magnetoresistance effect (TMR) element. In contrast, magnetic heads using CPP are expected to become popular because of the ability of the magnetic head 200 described above to use the TMR element and to narrow the gap W2 as described above. However, the magnetic head 200 leaks current at both ends 201A, 201B of the magnetoresistance effect element 201, and therefore has difficulty in producing an efficient flow in the perpendicular direction.

To control the magnetic domain of the magnetoresistance effect element 201, hard films 209A, 209B are formed on both ends 201A, 201B of the magnetoresistance effect element 201 for applying a longitudinal bias magnetic field (not shown). In this case, however, if the hard films 209A, 209B are electrically conductive materials, electrical shorts develop with the upper gap layer 204, which in turn lowers the yield.

To prevent shorts and current leakage, the conventional material forming the hard films 209A, 209B is a magnetic material that is insulating and has a coercive force (Hc) above a specific value, for example, 500 Oe (oersteds). However, this kind of magnetic material is difficult to accurately form on ends 201A, 201B of the magnetoresistance effect element 201. If a hard film does not have the required coercive force, the longitudinal bias magnetic field becomes unstable, and the signal magnetic field from the magnetic recording medium cannot be accurately reproduced.

Thus, a main object of the present invention is to provide an improved magnetoresistance effect magnetic head that does not have substantial leakage of current at the ends of the magnetoresistance effect element.

Another object of the present invention is to provide an improved magnetoresistance capable of applying a sufficiently stable longitudinal bias magnetic field to the magnetoresistance effect element.

Yet another of the present invention is to provide an improved magnetic recording/reproducing apparatus with the improved head.

These and other objects of the present invention are discussed or will be apparent from the detailed description of the invention.

SUMMARY OF THE INVENTION

In one aspect of the present invention, leakage currents in the ends of the magnetoresistance effect element can be suppressed by an insulating antiferromagnetic layer placed next to the ends of the element. When the magnetic layers are placed in contact with the antiferromagnetic layers, unidirectional anisotropic magnetic field is generated by the exchange coupling. The magnetic layers apply a stable longitudinal bias magnetic field to the magnetoresistance effect element. Thus, the bias application layer can apply the needed longitudinal bias magnetic field to the magnetoresistance effect element while maintaining an insulating property.

More specifically, a magnetoresistance effect magnetic head has a magnetoresistance effect element and a biasing portion for applying a longitudinal bias magnetic field to the magnetoresistance effect element on at least one end of the magnetoresistance effect element. The biasing portion includes an insulating antiferromagnetic layer and a magnetic layer in exchange coupling with the antiferromagnetic layer.

In another aspect of the present invention, a single antiferromagnetic layer can be provided above and below the magnetic layer to form a sandwich structure. Because the magnetic layer is sandwiched from the above and below by the insulating antiferromagnetic layers, a unidirectional anisotropic magnetic field stronger than the magnetic layer can be provided while also providing better insulation.

DETAILED DESCRIPTION

Figure 1:
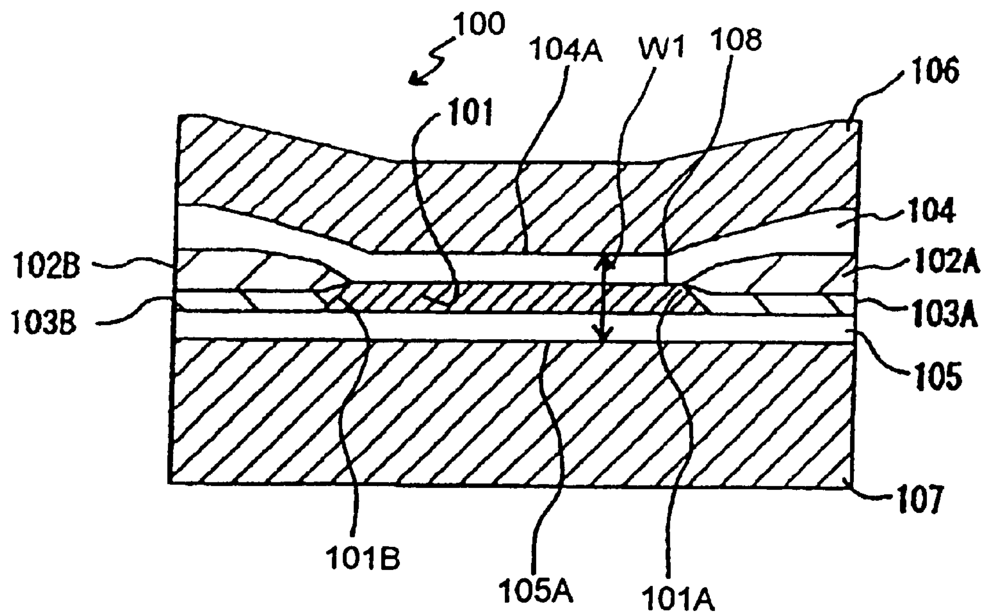
FIG. 1 is a cross-sectional view of the structure of a conventional magnetoresistance effect magnetic head as it faces a recording surface of a magnetic recording medium.
Figure 2:
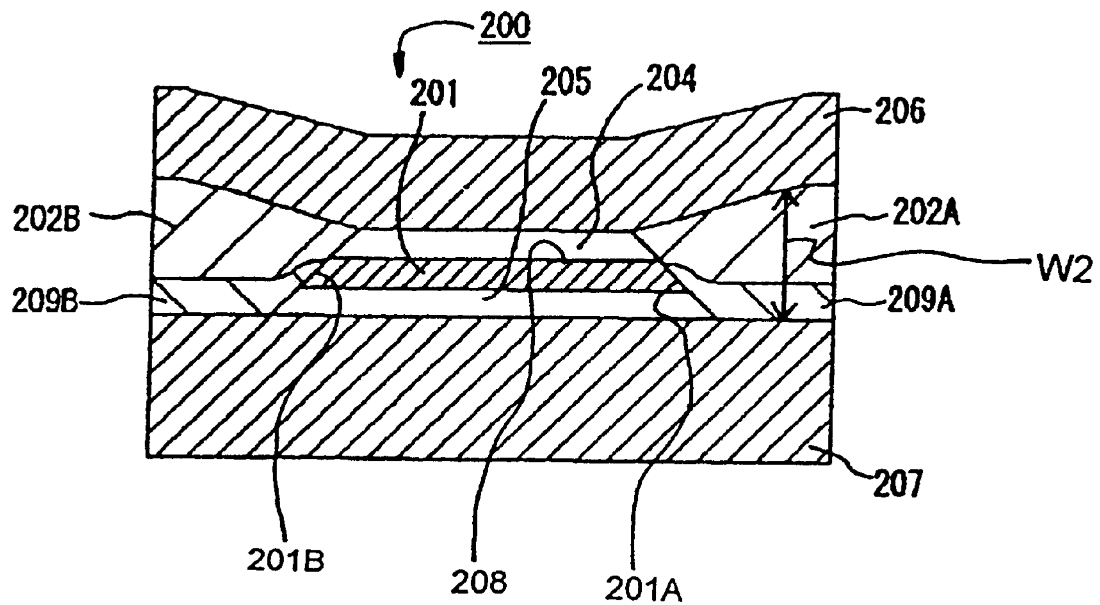
FIG. 2 is a cross-sectional view of the structure of another conventional magnetoresistance effect magnetic head.
Figure 3:
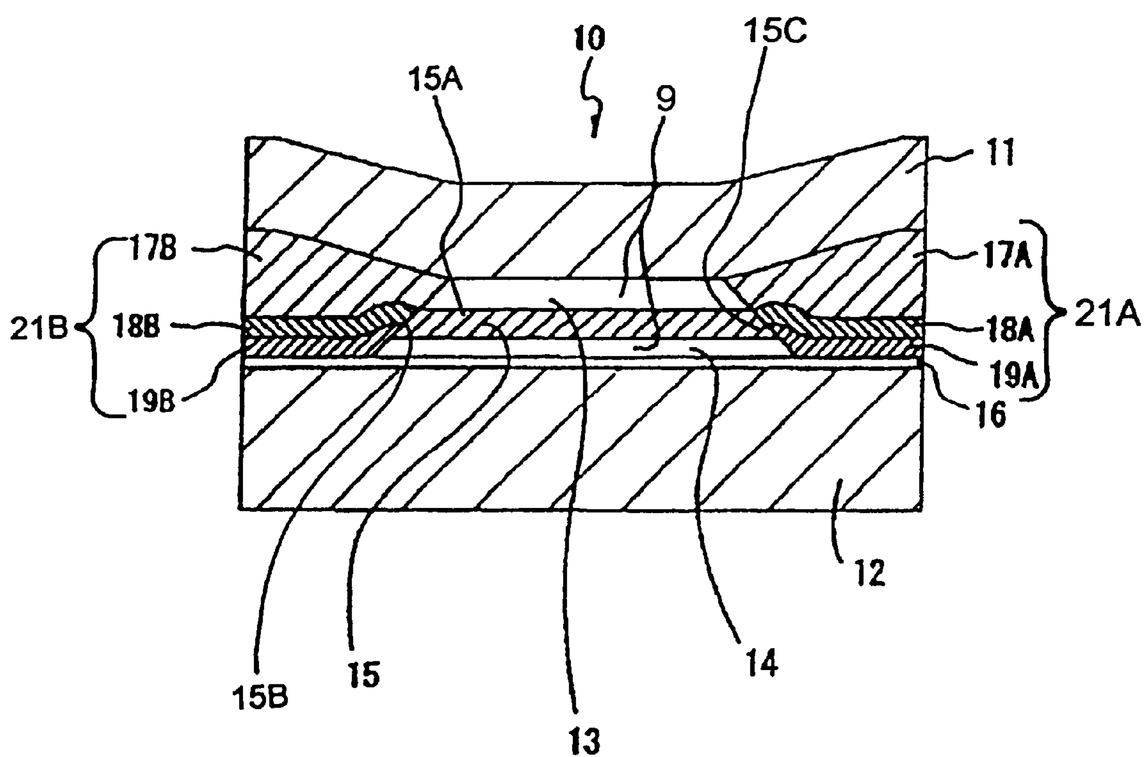
FIG. 3 is a cross-sectional view of the overall structure of a magnetic head in accordance with one aspect of the present invention.

Referring now to FIG. 3, a CPP magnetic head 10 has an MR element 15. The width of the MR element extends in the same general direction as the tracks of a magnetic recording medium (not shown) placed under the head 10. A generally extending plane of the MR element 15 is defined by a surface 15.

In FIG. 3, the magnetic head 10 has an upper shield 11 and a lower shield 12. These two magnetic shields 11, 12 are fabricated from a soft magnetic material, such as FeZrN, with a film thicknesses around 1 to 2 mm. These shields 11, 12 are electrically conductive and also function as lead terminals.

A gap 9 is formed between the shields 11, 12. The MR element 15 is located in the gap 9, and it is electrically connected to the upper shield 11 and the lower shield 12 through electrically conductive upper gap material 13 and lower gap material 14, respectively. Thus, the sense current (not shown) flows from the upper shield 11 (or the lower shield 12) through the upper gap material 13 (or lower gap material 14) into the MR element 15, and then flows perpendicular to plane or surface 15A through the lower gap material 14 (or upper gap material 13) to the lower shield 12 (or upper shield 11).

The MR element 15 described above can be a TMR element or an SVMR element. The TMR element can be a laminated film composed of $Al_2O_3$ as the insulating layer on the bottom, followed by the deposited layers of PdPtMn (20)/Co (2)/Al2O3 (5)/Co (1)/NiFe (2) (The numbers enclosed by parentheses indicate the thickness of each layer in nanometers (nm).). A laminated film composed of Cu can be used as the nonmagnetic layer on the bottom of the SVMR element, followed by the deposited layers of NiFe (2)/CoFeB (4)/Cu (3)/CoFeB (2.2)/PdPtMn (25). The TMR element and SVMR element can also be laminated films with the layers deposited in the reverse order than previously described.

Electrically conductive copper, gold, silver, platinum, or an alloy composed of these elements can be used for the upper gap material 13. Preferably, the upper gap material 13 is formed from copper with a film thickness about 20 nm. This also applies to the lower gap material 14. A 20 nm thick copper film can be used for the lower gap material. To form the preferred film formation, however, about 5 nm of tantalum (Ta) film 16 is formed as an underlayer of the lower gap material 14. Each layer described above can be formed as sequentially deposited layers using conventional thin film fabrication techniques.

Referring again to FIG. 3, bias portions or bias application layers 21A, 21B are provided on ends 15B, 15C of the MR element 15. In FIG. 3, the insulating antiferromagnetic layers 17A, 17B are respectively, and preferably, placed above the magnetic layers 18A, 18B. Insulating layers 19A, 19B are placed below the magnetic layers 18A, 18B. The biasing portions 21A, 21B are provided with left-right symmetry on both ends of the MR element 15. The antiferromagnetic layers 17A, 17B are preferably a single 30-nm thick layer of NiO, and can also be iron oxide ($\alpha$-$Fe_2O_3$) if it is a single layer.

In the alternative, the antiferromagnetic layer 17A or 17B can be a laminated body with multiple layers with, for example, insulating cobalt oxide-nickel oxide (CoO—NiO) or iron oxide-nickel oxide ($\alpha$-$Fe_2O_3$—NiO). In this case, the cobalt oxide or the iron oxide should be placed in contact with the magnetic layer 18A or 18B.

The magnetic layers 18A, 18B are preferably 20nm thick and can be either insulating or electrically conductive, depending on the goal of the design. Since layers 17A, 17B already insulate, magnetic layers 18A, 18B can be electrically conductive permalloys such as (NiFe), cobalt or cobalt ferrite (CoFe).

If on the other hand, more insulation to suppress current leaks is desired, the magnetic layers 18A, 18B can be soft or hard magnetic material. The hard magnetic materials can be cobalt ferrite ($CoFe_2O_4$), barium ferrite ($BaO.6Fe_2O_3$)

cobalt-platinum-silicon oxide (CoPt—$SiO_2$), or ferrite metals ($MO.Fe_2O_3$, MO indicates a metal oxide where M is any metal, for example, Cu or Mg). The soft magnetic materials mentioned above can be manganese-zinc-ferrite ($MnZnFe_2O_4$) or nickel-zinc-ferrite ($NiZnFe_2O_4$).

The magnetic layers 18A, 18B are preferably placed in contact with the antiferromagnetic layers 17A, 17B and with both ends 15B, 15C of the MR element 15. By shifting a B-H loop by exchange coupling with antiferromagnetic layers 17A, 17B, the magnetic layers 18A, 18B have their directions of magnetization fixed. As a result, because unidirectional anisotropic magnetic fields are generated in the magnetic layers 18A, 18B, a stable longitudinal bias magnetic field can be applied from the magnetic layers 18A, 18B to the MR element 15.

The insulating layers 19A, 19B can be formed from material such as alumina ($Al_2O_3$) to a 30-nm thicknesses. The insulating layers 19A, 19B can also be an insulating antiferromagnetic material, for example, 30-nm thick NiO. The bias application layers 21A, 21B form a sandwich including a magnetic layer between two antiferromagnetic layers (NiO/nickel-zinc-ferrite/NiO) so that the magnetic layer 18A, 18B is exchange coupled to both antiferromagnetic layers 17A and 19A or 17B and 19B, respectively, on both ends 15B, 15C of the MR element 15. With this structure, the biasing portions become powerful insulators, and the longitudinal bias magnetic field from the magnetic layers 18A, 18B is very stable.

Figure 4A:
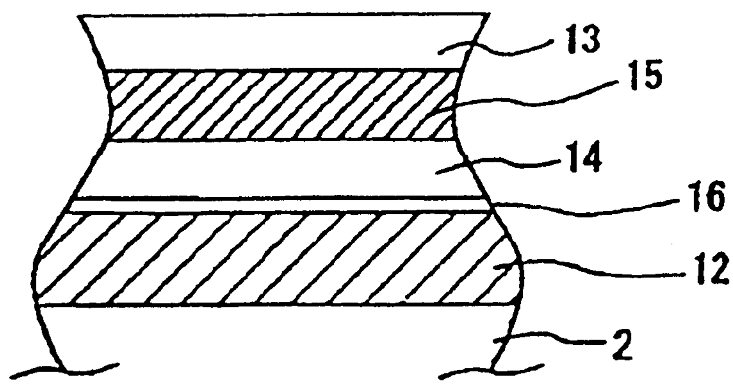
FIG. 4A is a cross-sectional view of layers used to form the magnetic head of FIG. 3 during a film fabrication process.

Referring now to FIG. 4A, the film fabrication process in the method for manufacturing the magnetic head 10 includes forming a FeZrN layer about 2-$\mu$m thick as the lower shield 12 by sputtering on an alumina-tantalum carbide substrate ($Al_2O_3$—TiC). On top of this, a tantalum film about 5-nm thick is formed as the lower gap substrate 16, and a copper film about 20-nm thick is formed as the lower gap material 14.

Materials for the head 10 are successively deposited by sputtering one layer on top of another layer starting with the lower gap material 14 on the bottom. Each layer of the SVMR element and the TMR element is formed as described above. Then a copper layer about 20-nm thick is formed on the MR element 15 as the upper gap material 13. The film fabricating process described above can be implemented as a continuous or a discontinuous process.

Figure 4B:
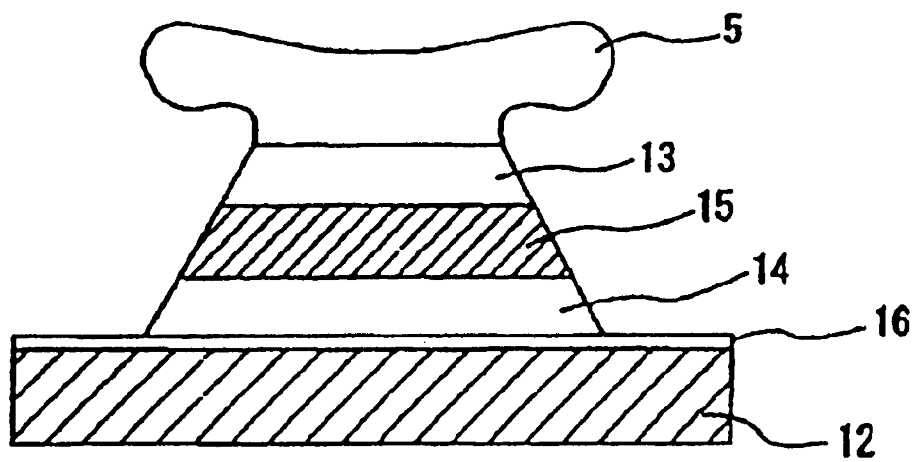
FIG. 4B is another cross-sectional view of the layers of the head of FIG. 3 during another portion of the film fabrication process for constructing the magnetic head of FIG. 3.

Referring now to FIG. 4B, about 1 $\mu$m wide by about 3 $\mu$m high resist 5 is patterned on the upper gap material 13 and then etched by ion milling until the copper of the lower gap material 14 or the tantalum of the lower gap substrate 16 is detected.

Figure 4C:
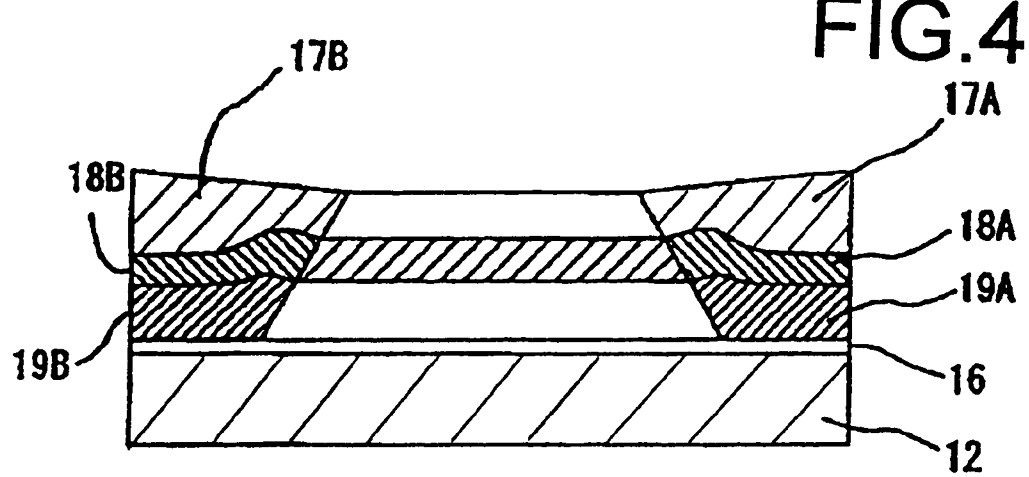
FIG. 4C is yet another cross-sectional view of the layers of the head of FIG. 3 during yet another part of the film fabrication process.

Referring now to FIG. 4C, after ion milling, the longitudinal bias application layers 17A to 19B are formed on both ends of the MR element 15. The films are successively formed from the bottom up by sputtering. Alumina ($Al_2O_3$) or NiO is used for the insulating layers 19A, 19B; nickel-zinc-ferrite is used for the magnetic layers 18A, 18B; and NiO is used for the antiferromagnetic layers 17A, 17B. The thicknesses of the layers are about 30 nm, 20 nm, and 30 nm, respectively. Then the resist 5 is lifted off. Finally, the FeZrN film is formed as the upper shield 11 (shown in FIG. 3) on the MR element 15 to complete the magnetic head 10 of FIG. 3.

Figure 5:
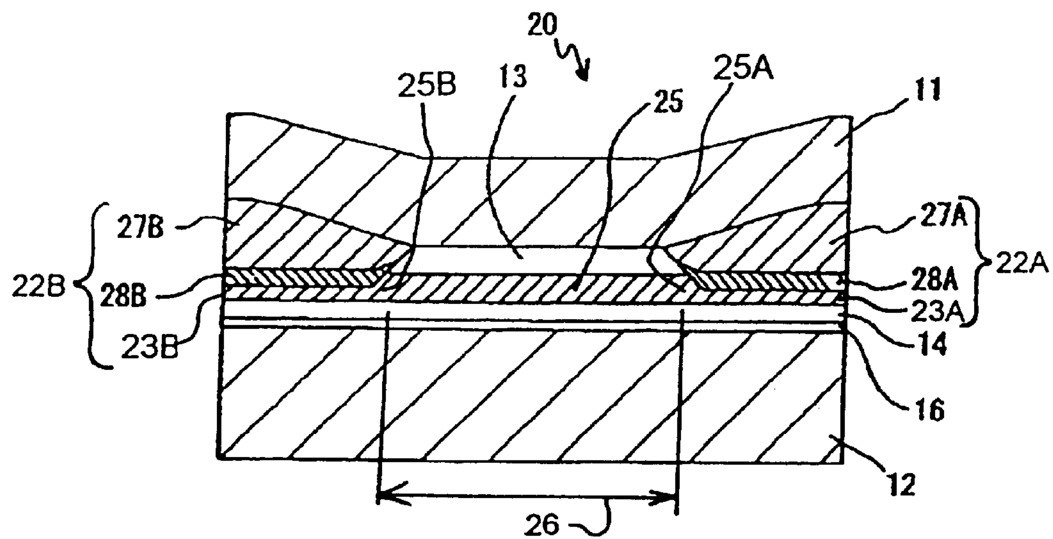
FIG. 5 is a cross-sectional view of the overall structure of another magnetic head of the present invention as it faces a magnetic recording medium.

Referring now to FIG. 5, another aspect of the present invention includes a magnetic head 20. The same reference numbers used for parts in FIG. 3 are assigned to the same parts for FIG. 5. Longitudinal bias application layers or biasing portions 22A, 22B of the magnetic head 20 each has two layers, an insulating antiferromagnetic layer 27A or 27B and an electrically conductive magnetic layer 28A or 28B in contact with the antiferromagnetic layer 27A or 27B respectively. The antiferromagnetic layers 27A, 27B can be insulating NiO. The magnetic layers 28A, 28B can be a magnetic material such as electrically conductive NiFe or CoFe.

In the magnetic head 20, the MR element 25 has extensions 23A, 23B on both ends 25A, 25B of MR element 25 that are part of the biasing portions 22A, 22B. On the biasing portions 22A, 22B, magnetic layers 28A, 28B are disposed between insulating antiferromagnetic layers 27A, 27B and the extensions 23A, 23B, respectively. Thus, at least a portion of the same layer used to form the MR element 25 is present at the lead terminal sides or biasing portions 22A, 22B in the laminated structure, but only the region 26 of the MR element 25 interposed between the biasing portions 22A, 22B functions as the actual MR element 25.

The magnetic head 20 can be manufactured in the same manner as shown in FIGS. 4A–4C to manufacture the magnetic head 10. However, the magnetic head 20 reduces the amount of etching of the MR element 25 required and eliminates the need to etch the lower gap material 14, since the magnetic head 20 preferably only requires etching through a portion of the MR element 25 (as best seen in FIG. 5).

Specifically, MR element 25 can be an SVMR element with films successively deposited in layers from bottom to top of NiFe (2 nm)/CoFeB (1 nm)/Cu (3 nm)/CoFeB (2 nm)/PdPtMn (20 nm)/NiFe (2 nm), or a TMR element with films successively deposited in layers from bottom to top as NiFe (2 nm)/PdPtMn (20 nm)/Co (2 nm)/$Al_2O_3$ (5 nm)/Co (1 nm)/NiFe (2 nm). For the longitudinal bias application layers or biasing portions 22A, 22B in magnetic head 20, the SVMR element is preferred for suppressing the effect of leakage current.

Both ends 25A, 25B are etched by ion milling until the top layer of NiFe of the MR element 25 is detected. Then the remainder of the biasing portions are formed from a NiFe magnetic layer 28 about 10 nm thick and an insulating NiO antiferromagnetic layer 27 about 40 nm thick.

Figure 6:
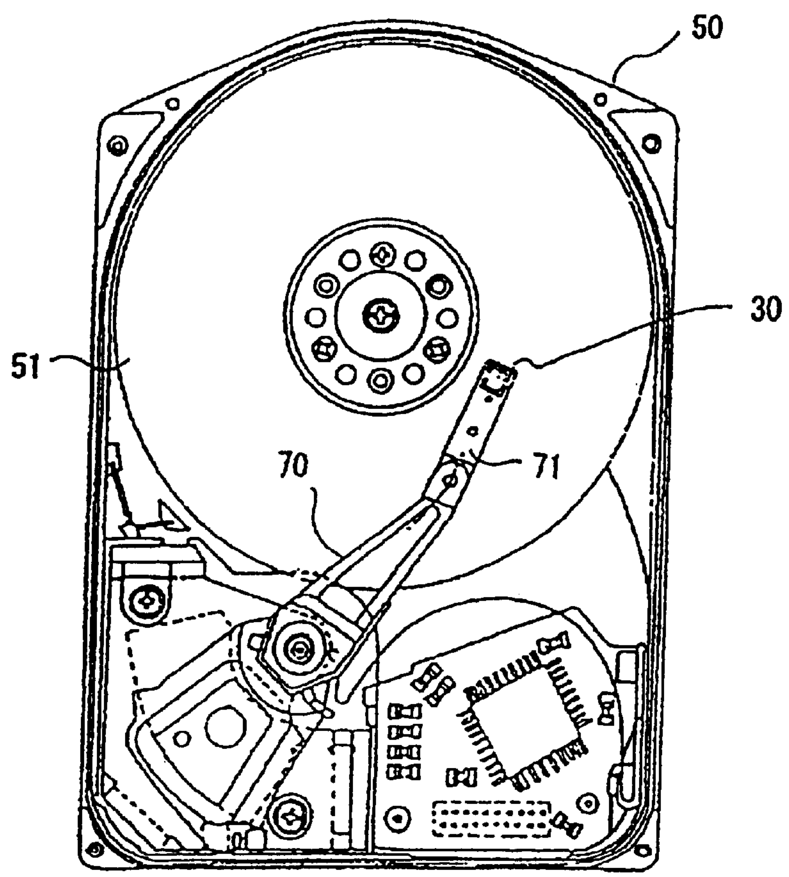
FIG. 6 is a plan view of an uncovered magnetic recording/reproducing apparatus that uses the magnetic head of either FIG. 3 or FIG. 5 of the present invention.

Referring now to FIG. 6, a magnetic recording/reproducing apparatus 50 equipped with a composite magnetic head 30 has a magnetic recording medium such as a hard disk 51 rotatably mounted in the magnetic recording/reproducing apparatus 50. At a specific flying height above the surface of the hard disk 51, magnetic reproduction is performed by a composite magnetic head 30, which has the MR element 15 on the reproduction part of the head. The composite magnetic head 30 is fixed to the front end of a slider 71 at the front end of an arm 70. Positioning the composite magnetic head 30 can be accomplished by a two-stage actuator that combines an ordinary actuator and an electromagnetic fine motion actuator.

From the description above, it will be appreciated that the free magnetic layers (not shown) in the MR elements 15 or 25 have magnetic domains controlled in preferred states by the longitudinal bias magnetic fields originating from the biasing portions 21A, 21B or 22A, 22B, and specifically from the magnetic layers 18A, 18B or 28A, 28B due to coupling with the antiferromagnetic layers 17A, 17B or 27A, 27B respectively. The magnetoresistance effect can then effectively eliminate or reduce problems like Barkhausen noise. The antiferromagnetic layers 18A, 18B or 27A, 27B also suppress the generation of leakage current. Consequently, the sense current efficiently flows in the direction perpendicular to the MR elements 15 or 25, and the magnetic head 10 or 20 can accurately detect the signal magnetic field from the magnetic recording medium. Thus, the biasing portions 21A, 21B or 22A, 22B replace the known hard films that had strong insulating properties and provided the desired coercive force but were difficult to manufacture. In addition, the yield is improved.

It will be appreciated that although magnetic heads 10, 20 are designed to reproduce the signal magnetic field from the magnetic recording medium with high sensitivity, either magnetic head 10 or 20 of the present invention can be combined with an inductive thin-film head to form a recording/reproducing head or composite head.

Although preferred embodiments of the present invention were described above, the present invention is not limited to these specific embodiments. Various modifications are possible within the scope of the present invention as described in the appended claims.

What is claimed is:

1. A CPP magnetoresistance effect magnetic head comprising:

an electrically conductive upper shield and an electrically conductive lower shield;

a magnetoresistance effect element disposed between said upper shield and said lower shield and having a first end and a second end; and a biasing portion provided at said first end and said second end of said magnetoresistance effect element for applying a longitudinal bias magnetic field to said magnetoresistance effect element at one of said first end and said second end of said magnetoresistance effect element, said biasing portion including a magnetic intermediate layer, a first antiferromagnetic layer provided between said intermediate layer and said upper shield layer for insulating said intermediate layer from said upper shield, and a second layer provided between said intermediate layer and said lower shield.

2. The magnetoresistance effect magnetic head according to claim 1, further comprising:

an electrically conductive upper gap material provided between said upper shield and said magnetoresistance effect element and an electrically conductive lower gap material provided between said lower shield and said magnetoresistance effect element.

3. The magnetoresistance effect magnetic head according to claim 2, further comprising a substrate film disposed between said lower gap material and said lower shield, and between said second layer and said lower gap material.

4. The magnetoresistance effect magnetic head according to claim 3, wherein said substrate film is formed from copper and has a thickness of approximately 20 nm.

5. The magnetoresistance effect magnetic head according to claim 1, wherein said first layer is a single layer of one of (NiO) and ($\alpha$-$Fe_2O_3$).

6. The magnetoresistance effect magnetic head according to claim 1, wherein said first layer includes at least two layers of one of (CoO—NiO) and ($\alpha$-$Fe_2O_3$—NiO).

7. The magnetoresistance effect magnetic head according to claim 1, wherein said first layer has a thickness of approximately 30 nm.

8. The magnetoresistance effect magnetic head according to claim 1, wherein said second layer is formed from one of ($Al_2O_3$) and (NiO).

9. The magnetoresistance effect magnetic head according to claim 8, wherein said second layer has a thickness of approximately 30 nm.

10. The magnetoresistance effect magnetic head according to claim 1, wherein said intermediate layer is an electrically conductive layer of one of(NiFe), (Co) and (CoFe).

11. The magnetoresistance effect magnetic head according to claim 1, wherein said intermediate layer is a hard magnetic material of one of cobalt ferrite, barium ferrite, cobalt-platinum-silicon oxide, and ferrite metals.

12. The magnetoresistance effect magnetic head according to claim 1, wherein said intermediate layer is a soft magnetic material of one of manganese-zinc-ferrite and nickel-zinc-ferrite.

13. The magnetoresistance effect magnetic head according to claim 1, wherein said second layer is formed by a portion of said magnetoresistance effect element which extend from said first end and said second end of said magnetoresistance effect element.

14. The magnetoresistance effect magnetic head according to claim 13, wherein said intermediate layer is an SVMR element having NiFe, CoFeB, Cu, CoFeB, PdPtMn, and NiFe films successively formed on top of each other.

15. The magnetoresistance effect magnetic head according to claim 13, wherein said intermediate layer is a TMR element having NiFe, PdPtMn, Co, $Al_2O_3$, CO films successively formed on top of each other.

16. A magnetic recording/reproducing apparatus having at least one magnetic recording medium rotatably mounted therein, comprising:

an actuator pivotally mounted in said magnetic recording/reproducing apparatus;

an arm having a proximate end and a distal end, said proximate end being connected to said actuator;

a suspension having a base end and a mounting portion, said base end being connected to said distal end of said arm;

a slider attached to said mounting portion; and a CPP magnetoresistance effect magnetic head attached to said slider, said magnetoresistance effect magnetic head including, an electrically conductive upper shield and an electrically conductive lower shield, a magnetoresistance effect element disposed between said upper shield and said lower shield and having a first end and a second end, and a biasing portion provided at said first end and said second end of said magnetoresistance effect element for applying a longitudinal bias magnetic field to said magnetoresistance effect element at one of said first end and said second end of said magnetoresistance effect element, said biasing portion including a magnetic intermediate layer, a first antiferromagnetic layer provided between said intermediate layer and said upper shield layer for insulating said intermediate layer from said upper shield, and a second layer provided between said intermediate layer and said lower shield layer.

17. The apparatus according to claim 16, wherein said second layer is formed from one of ($Al_2O_3$) and (NiO).

18. The apparatus according to claim 17, wherein said intermediate layer is an electrically conductive layer of one of (NiFe), (Co) and (CoFe).

19. The apparatus according to claim 16, wherein said second layer is formed by a portion of said magnetoresistance effect element which extends from said first end and said second end of said magnetoresistance effect element.

* * * * *